United States Patent [19]

Chapin

[11] Patent Number: 4,572,756
[45] Date of Patent: Feb. 25, 1986

[54] DRIP IRRIGATION SYSTEM EMPLOYING ADJACENTLY ARRANGED FLOW-RESTRICTING PASSAGES

[76] Inventor: Richard D. Chapin, 368 N. Colorado Ave., Watertown, N.Y. 13601

[21] Appl. No.: 691,942

[22] Filed: Jan. 16, 1985

Related U.S. Application Data

[62] Division of Ser. No. 364,229, Apr. 1, 1982, Pat. No. 4,534,515.

[51] Int. Cl.[4] .............................................. B29C 53/00
[52] U.S. Cl. .................................... 156/203; 156/290; 156/291; 156/466; 264/284
[58] Field of Search .............. 156/291, 292, 203, 466, 156/218, 295, 308.4, 548, 290; 264/284, 293; 239/542, 145, 547; 428/188, 195, 201, 36; 427/264, 270, 274, 359

[56] References Cited

U.S. PATENT DOCUMENTS

| Re. 28,095 | 7/1974 | Chapin . | |
| 2,798,768 | 7/1957 | Babin . | |
| 2,999,042 | 9/1961 | Meister | 156/203 X |
| 3,361,359 | 1/1968 | Chapin | 239/145 |
| 3,426,544 | 2/1969 | Curtis . | |
| 3,467,142 | 9/1969 | Boyle et al. . | |
| 3,672,571 | 6/1972 | Goodricke | 239/145 |
| 3,777,987 | 12/1973 | Allport | 239/542 |
| 3,816,206 | 6/1974 | Coster | 156/218 |
| 3,866,833 | 2/1975 | Shibata et al. | 239/76 |
| 3,870,236 | 3/1975 | Sahagun-Barragan | 239/542 |
| 3,874,598 | 4/1975 | Havens | 239/542 |
| 3,903,929 | 9/1975 | Mock | 239/145 X |
| 4,009,832 | 3/1977 | Tiedt | 239/542 |
| 4,047,995 | 9/1977 | Leal-Diaz | 239/542 X |
| 4,173,309 | 11/1979 | Drori | 239/542 |
| 4,195,784 | 4/1980 | Gilead | 239/542 |
| 4,196,853 | 4/1980 | Delmer | 239/116 |
| 4,199,106 | 4/1980 | Kojimoto et al. | 239/542 |
| 4,235,380 | 1/1980 | Delmer | 239/542 X |
| 4,247,051 | 1/1981 | Allport | 239/542 |
| 4,473,191 | 9/1984 | Chapin | 239/542 |
| 4,490,962 | 1/1985 | Weis et al. | 156/203 X |

Primary Examiner—David Simmons
Attorney, Agent, or Firm—Fleit, Jacobson, Cohn & Price

[57] ABSTRACT

An elongated fluid distributing hose for use in an irrigation system for plants, vegetables, and the like. The hose incorporates a particular arrangement of a main supply channel for gross water movement, and a water distributing network for fine water movement. The major water pressure reduction takes place in the water distributing network made up of a series of first, second, and third fluid-restricting passages and is eventually released to the exterior of the hose through a series of discharge fluid-passing openings or outlet stations. A novel method and machine are employed to manufacture the hose embodying the teachings of the subject invention.

20 Claims, 24 Drawing Figures

DRIP IRRIGATION SYSTEM EMPLOYING ADJACENTLY ARRANGED FLOW-RESTRICTING PASSAGES

This is a divisional application of Ser. No. 364,229, filed Apr. 1, 1982, now U.S. Pat. No. 4,534,515, and is related to Ser. No. 550,138, filed Nov. 4, 1983, now abandoned, a continuation-in-part of Ser. No. 364,229, and also is related to Ser. No. 364,213, filed Apr. 1, 1982, now U.S. Pat. No. 4,473,191, and its divisional application Ser. No. 634,475, filed July 25, 1984.

BACKGROUND OF THE INVENTION

1. Field of the Invention

This invention relates to a water distributing hose for use in a trickle irrigation or drip irrigation system.

2. Background of the Prior Art

The present invention relates to irrigation systems particularly adapted for the surface or subsurface watering of long runs of crops, whether on greenhouse benches or in the field, and more specifically relates to a trickle irrigation system wherein the water is allowed to discharge slowly, directly at the desired point of application, normally about the base of the plants.

Recent innovations in irrigation technology have been directed to the concept of trickle irrigation. As an example, in row crops, it is only necessary to irrigate the rows and not the entire field. Such a limiting of the watering to the rows by trickle irrigation can effect a water saving of approximately 40 to 50 percent. As the need for food for the world's expanding population increases and water shortages become more acute, such savings will become increasingly more important. In this connection, trickle irrigation is especially significant because it delivers water at or below the surface and provides for a significant conservation of water.

Since there is considerably less water used in trickle irrigation, it is important that the water be directed precisely to the plant's root area. The flow from some known prior art hoses comes out in a tiny squirt, which can be blown by the wind so that sometimes it does not uniformly wet the area next to the plant row. When an irrigation hose is located on top of the soil, it is often twisted slightly by the contour of the soil. This causes the squirt to come out at different angles. The water from some of the squirts could fall next to the plant row and other squirts would be directed between the rows of plants leaving some root areas dry.

When the irrigation hose is used under a plastic mulch, as is frequently done, the flow sometimes squirts against the underside of the plastic mulch which deflects the water and causes part of it to follow on the underside of the plastic and run off into the aisle between the plant rows. The squirt sometimes has enough force to cause a tiny washout on elevated beds so that water runs down the side of the bed into the aisle rather than remaining on top of the bed surface and uniformly penetrating the entire bed.

To be practical, trickle irrigation must provide for the delivery of water at a slow uniform rate over long lengths or runs of hose. In the past, various trickle irrigation systems have been tried, including pipes with small holes, pipes with various types of small outlet members, pipes with small tubes for outlets, plastic pipes with slits, tubes which ooze water through the wall, and hoses which ooze water through a sewn seam. Each type has depended on a small orifice, low pressure, friction created in a long outlet member such as a tube, or a combination of these to limit the flow through each individual outlet. However, there are disadvantages associated with each such known system. For example, the use of extremely small orifices such as holes, slits, or the like, tend to clog easily. Tube outlets and special outlet members are relatively expensive to produce and ship, particularly when considering the large quantities required. In addition, low pressure systems and tubes which provide for an oozing of the water through the wall are not capable of producing a uniform flow along the length of the hose or the like, particularly on sloping runs.

Since drip irrigation hoses are commonly made with wall thicknesses ranging from 0.003' to 0.030", the hoses are sometimes subject to damage from ants. When this occurs, ants have been known to go through the main wall of the hose, but usually they will chew around the edges of existing discharge openings, enlarging them, sometimes to several times their original diameter. This causes the hose to have a heavy water flow at the enlarged discharge opening and a much lower flow in other nearby openings, resulting in a non-uniform irrigation.

One water distributing hose which has met with success is that disclosed in U.S. Pat. No. Re. 28,095, reissued July 30, 1974 to Chapin. In the reissue patent, a multi-chamber water distributing hose is shown in the context of a trickle irrigation system. Another hose which has met with success is that disclosed in copending U.S. patent application Ser. No. 261,699, filed May 8, 1981, in the name of Chapin. The hose of the Chapin application is an elongated water distributing hose capable of effectively watering large areas with readily available water pressures and in a manner whereby an essentially uniform watering is achieved. The pressure is substantially maintained throughout the length of the hose through a stacked arrangement of first, second, and third fluid channels, which enable a maintaining of the relatively high pressure throughout the length of the hose and the reduction of this pressure directly at the point of the passing of the water from the higher pressure first fluid channel through a series of first fluid-passing openings to the much smaller second fluid channel, and a further pressure reduction as the water passes within the third fluid channel between a series of second fluid-passing openings and a series of discharge fluid-passing openings.

Although the performance of both of the Chapin hoses has been excellent, there is, nevertheless, always a need for improved performance. The present invention is directed toward filling that need while at the same time minimizing the disadvantages described above in connection with known systems.

SUMMARY OF THE INVENTION

The present invention relates to an elongated fluid distributing hose for use in an irrigation system for plants, vegetables, and the like. The hose of the present invention enables the construction of a drip irrigation system which is relatively inexpensive while at the same time capable of effectively watering large areas with readily available water pressures and in a manner whereby an essentially uniform watering is achieved. This desired uniform watering results notwithstanding sloping ground conditions and the like. Water pressure is substantially maintained throughout the length of the tube without requiring the use of extremely small orifices which easily clog from impurities, reliance instead being had on a particular arrangement of a main supply channel for gross water movement, and a water distributing network for fine water movement. The main supply channel exhibits relatively high water pressure throughout the length of the hose. A reduction of this pressure takes place in the water distributing network with the passing of the water from the high pressure main supply channel through a series of first fluid-passing openings or inlet stations to a much smaller first fluid-restricting passage. In much the same way, the fluid is passed through second and third fluid-restricting passages and is eventually released to the exterior of the hose through a series of discharge fluid-passing openings or outlet stations.

The hose of the instant invention is preferably of a thin water-impervious plastic material, such as polyethylene. The main supply channel moves the water at a relatively high pressure along the full length of the hose for discharge into the water distributing network for final discharge out of the hose itself through a number of openings or outlet stations in the outer passage. The pressure decrease within the water distributing network is such that the flow of water at the outlet stations of the network is in the form of a drip under substantially quiescent conditions.

A novel method and machine are employed to manufacture the hose embodying the teachings of the subject invention. Basically, the hose is manufactured by moving an elongated impervious film in a given direction. The film is oriented to expose an outer surface and margin of the film. Disposed on this outer surface in a parallel array is a plurality of hot melt plastic beads. The beads are placed on the film by a conventional extrusion nozzle. The beads are positioned so that they extend along the margin, essentially parallel to the longitudinal axis of the elongated film.

The film continues to move in the given direction and transports the previously deposited hot melt beads to a molding station where each of the beads is molded by deformation in a predetermined manner by a molding tooth to create a permanent depression within each of the beads, thereby molding each hot melt bead into a series of longitudinally-extending, spaced apart strips. The spaces created by the molding tooth eventually become the fluid passing openings between the various flow channels.

The film continues to move through a guide which causes the flat material to be folded upon itself so that the interior surface of the other margin of the film comes into contact with the hot melt beads. The structure then passes through a pair of forming wheels which places the top film in intimate contact with the top of the hot melt strips causing the top film to bond to the spaced apart strips at a precise distance from the common wall of the film thus creating the flow restricting passages.

Advantages and objects of the present invention include the provision of a system which can be inexpensively produced, such being essential because of the vast quantities of hose needed to irrigate field crop installations which typically involve thousands of acres. The system is compact, the hose capable of being flattened and rolled, thereby simplifying the handling, storage, shipping, installation and removal. The hose used is of a highly durable nature. In addition, large areas can be simultaneously watered without requiring excessively high pressures or large volumes of water with the distribution of the water being uniform over extremely long lengths as well as on sloping layouts and in both surfaces and subsurface installations.

These together with other objects and advantages, which will become subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to FIG. 1–4, reference 10 is used to generally designate the water distributing hose embodying the teachings of the present invention. The hose 10 basically comprises a gross water distributing channel 12 and a fine water distributing network 14. Adjacent to channel 12 and sharing a common wall 16 is the network 14, which basically comprises a plurality of flow restricting passages 18–20, positioned one next to the other in a common curved plane and disposed about the exterior of the main supply channel 12. Each of the passages is substantially equidistant from the longitudinal axis A of the main supply channel. As can be seen, the three fluid passages 18–20 are arranged in a generally parallel relationship throughout the length of the hose.

In use, the main supply channel 12 is connected to a source of pressurized water. This can be effected, for example, by connecting the main supply channel 12 at one end of hose 10 to a suitable fitting 21 in main 25. The other end 11 of the hose 10 is closed off to prevent escape of the water entering the hose. Such an arrangement has been generally illustrated in FIG. 1 wherein the hose 10 is illustrated next to rows of vegetables in a large field. It will be appreciated that such an arrangement is also equally adaptable for use in greenhouses and home gardens.

Figure 1:
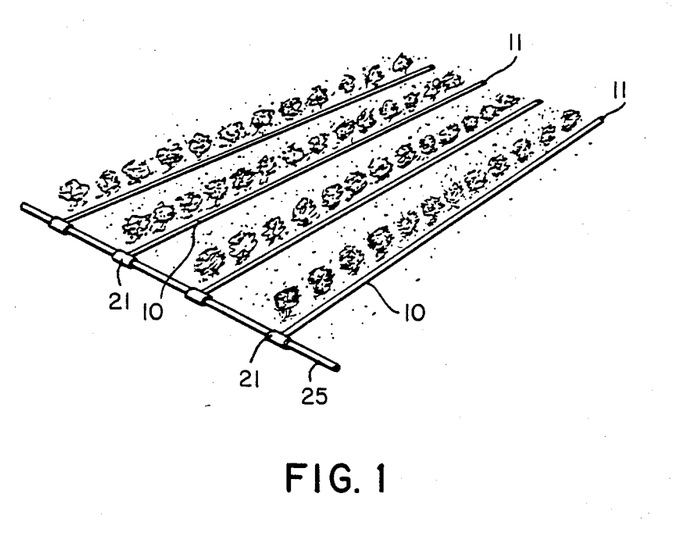
FIG. 1 is a perspective view showing a portion of a field making use of the irrigation system of the present invention.
Figures 2, 3, 4:
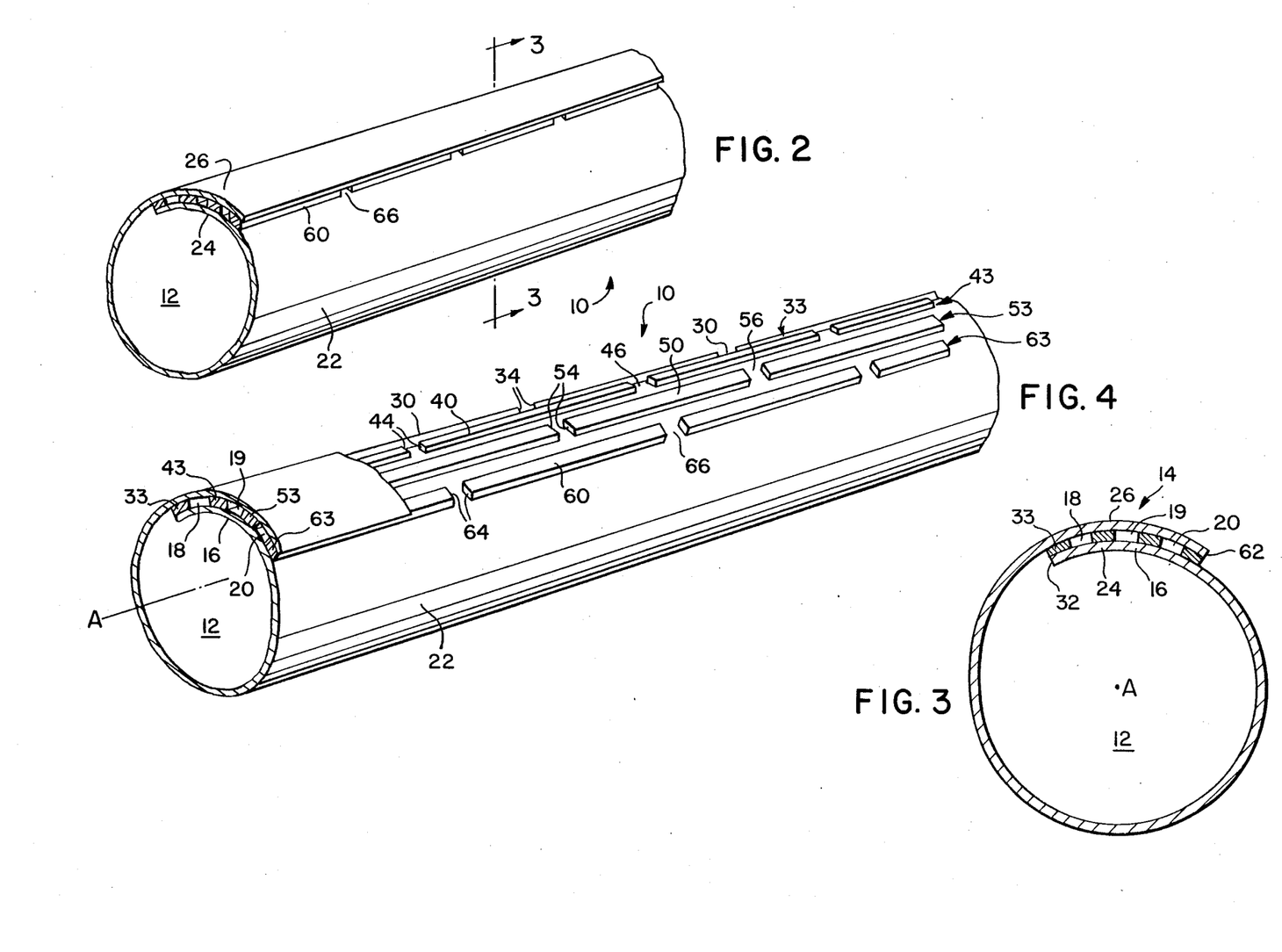
FIG. 2 is a perspective view of a portion of a hose embodying the teachings of the subject invention.
FIG. 3 is a section taken along lines 3—3 of FIG. 2.
FIG. 4 is a view similar to that of FIG. 2 with a portion of the hose removed to reveal the interior structure of the flow restricting passages.

With reference to FIGS. 2 through 4, an elongated layer or sheet 22 of thin water-impervious plastic material, such as a thermoplastic film, terminates in two longitudinally extending margins 24 and 26 which overlap each other in a predetermined fashion. Interposed between the overlapping margins are a series of elongated longitudinally extending strips of varying lengths and arranged in a particular manner, yet to be described, to define the fine water-distributing network 14. The strips are also made from a water-impervious plastic material.

A first set of strips 30 are positioned near the edge 32 of margin 24, so that each of the strips define an axis substantially parallel to and equidistant from the longitudinal axis A of the hose 10. The ends 34 of the strips are periodically spaced from each other to define inlet stations as a series of fluid-passing openings 36 therein. The frequency of the inlet stations typically ranges from a few inches to several feet throughout the full length of the hose. The inlet stations or first fluid-passing openings 36 are positioned so that they form a means of fluid communication between the main supply channel 12 and the first flow-restricting passage 18 of the network 14. The spaces between the strips 30 define the first inlet stations 36 and the strips 30, in effect, define a common wall 33 between the main supply channel 12 and the first passage 18.

In like manner, a second set of strips 40 are positioned near to, but spaced from, the wall 33 defined by strips 30. The second set of strips also have their ends 44 spaced from each other to define a further set of fluid-passing openings or inlet stations 46, to form a means of fluid communication between the first passage 18 and the second flow-restricting passage 19. Thus, the second fluid-passing openings 46 are positioned somewhere along the common wall 43 between the first and second passages 18 and 19 as defined by the strips 40. The second fluid-passing openings 46 generally have substantially the same spacing between them as the spacing formed between the first fluid-passing openings or inlet stations 36. In actual practice, the spacing of the second fluid-passing openings 46 can vary from a few inches up to several feet.

Additionally, a third set of strips 50 are positioned near to, but spaced from, the wall 43 defined by strips 40. The third set of strips also have their ends 54 spaced from each other to define a third set of fluid-passing openings or inlet stations 56 to form a means of fluid communication between the second passage and the third flow-restricting passage 20. Thus, the third fluid-passing openings 56 are positioned somewhere along the common wall 53 between the second and third passages 19 and 20 as defined by the strips 50. The third fluid-passing openings 56 generally have substantially the same spacing between them as the spacing formed between the first fluid-passing openings 36.

Finally, a fourth set of strips 60 are positioned near the edge 62 of the margin 26 so that the strips define an axis substantially parallel to the longitudinal axis A of the hose 10. The placement of the strips 60 is such that they are positioned near to, but spaced from, the wall 53 defined by strips 50. The ends 64 of the strips are spaced from each other to define a fourth series of fluid discharge openings or outlet stations 66 to provide for fluid communication between the third passage and the exterior of the hose. In the preferred embodiment, the spacing between the outlet stations 66 is substantially the same as that between the third inlet stations 56.

In the preferred embodiment, the inlet and outlet stations 36, 46, 56 and 66, which may also be referred to as cross passageways, are substantially of a rectangular cross section and precisely formed by the positioning of the strips between the overlapping margins 24 and 26. The size of the outlets at each station is chosen so that there is a minimum chance of clogging as water passes through the station.

Figure 5:
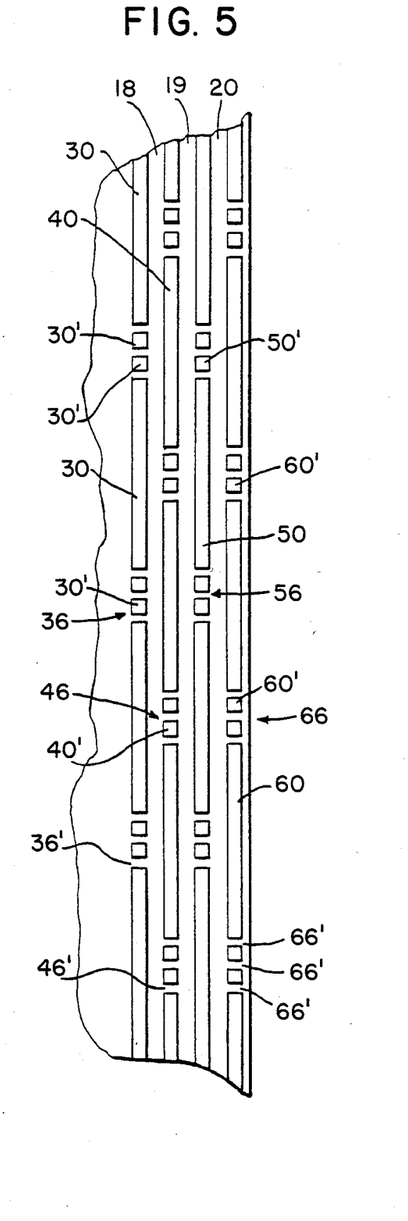
FIG. 5 is a schematic view of a second embodiment of a hose incorporating the teachings of the present invention.

For the purposes of simplifying the presentation, the fluid passing stations 36, 46, 56 and 66 in FIGS. 1–4 are shown in the context of a less preferred embodiment as a single opening. However, in a more preferred embodiment, such as that shown in FIG. 5, three or more openings are used close together to comprise each station. By example, the three openings 66' constitute one fluid passing station which provides multiple openings at each station so that if one opening should clog, the other two openings can carry the flow through the station.

It is understood that a larger number of closely spaced fluid passing openings may constitute the first, second and third inlet stations 36, 46 and 56 and the discharge stations 66 as long as the total cross-sectional area of the openings associated with each station exceed a minimum size so that there is a minimum amount of clogging across the station.

In the preferred embodiment, having 8 inches between the centers of like fluid passing stations, the dimension of each fluid passing opening is approximately 0.060 inches in width, a height substantially the same as the height of strips 30, 40, 50 and 60 or about 0.014 inches and a length of about 0.070 inches which is substantially the same as the width of the strips.

Figure 6:
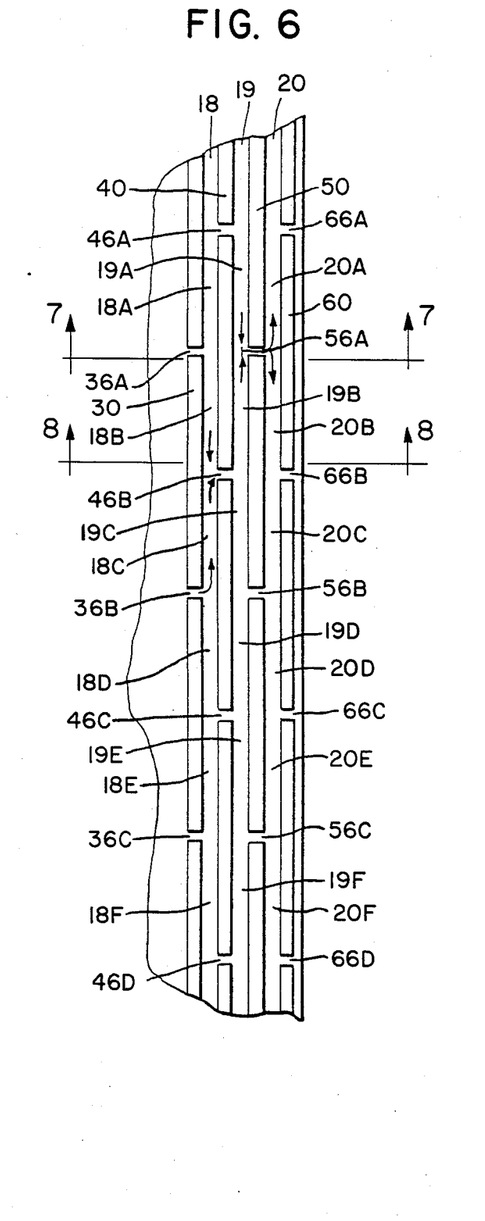
FIG. 6 is a schematic view useful in explaining the operation of the hose of FIG. 4.

The length of the flow passage through each fluid passing opening is substantially longer than the mean average between the width and height dimensions of the fluid passing opening. In effect, each fluid passing opening is in itself a short pressure-drop channel. With reference to FIG. 6, this pressure-drop phenomena may be explained as follows. Using flow channel 19 as exemplary, the flow from segment 19A of flow channel 19 comes directly toward the flow from segment 19B which is coming from the opposite direction and they meet at the fluid passing opening 56A. Each flow thus makes a 90° turn and flows straight for 0.070 inches through the length of fluid passing opening 56A. The flows are then divided and each flow makes a 90° turn into flow restricting segments 20A and 20B of flow channel 20. It is desirable to have the length of the fluid passing opening (for example, 56A), which is also the thickness of wall 50, at least three times the thickness of the common wall 16 to get an increase in friction and pressure loss as the flow makes two sharp 90° turns in going through the fluid passing openings from one flow restricting passage to another. The same relationship exists for the lengths of the remaining fluid passing openings 36, 46 and 66 relative to the thickness of common wall 16. Of particular significance is the provision of this 3 to 1 minimum ratio with regard to inlet stations 36 and outlet stations 66.

In the preferred embodiment of FIG. 2, using a 6 mil. polyethylene film, all fluid passages 18-20 have a generally rectangular configuration with a height of approximately 0.014 inch and a width of about 0.070 inch. The first fluid-passing openings 36 are spaced approximately eight inches apart. The second fluid-passing openings 46 are spaced eight inches apart with each opening 46 being located intermediate between, but spaced from, a pair of openings 36. The third fluid-passing openings 56 are spaced eight inches apart with each opening 46 being located intermediate between. Finally, the outer openings 66 are spaced eight inches apart with each opening 66 being located intermediate between, but spaced from, a pair of openings 56.

In a preferred embodiment, as the main supply channel 12 of hose 10 is pressurized at 8 psi, water flows through first inlet stations 36 located in wall member 33 which separates channel 12 and passage 18. The flow is then divided and moves within passage 18 to the nearest second inlet station 46 on either side of the first inlet station 36. Flow-restricting passage 18 has a length between inlet stations and a cross section of a size to reduce the pressure by approximately 1.0 psi within passage 18 between first fluid inlet stations 36 and second inlet stations 46.

Water then flows through the second fluid passing openings or inlet stations 46 located in wall member 43 between passages 18 and 19 into passage 19 with an approximate 0.2 psi pressure loss. The flow is then divided and moves within passage 19 to the nearest third fluid passing openings or inlet stations 56 on either side of each of the second fluid passing openings 46. Flow-restricting passage 19 has a length between openings and an interior cross section of a size to reduce the pressure by approximately 1.5 psi within passage 19 between fluid passing openings 46 and fluid passing openings 56.

The water then flows through fluid passing openings or inlet stations 56 located in wall member 53 between passages 19 and 20 with an approximate 0.5 psi pressure loss into passage 20. The flow is then divided and moves within passage 20 to the nearest discharge fluid passing opening 66 on either side of fluid passing opening 56. Flow-restricting passage 20 has a length between openings and an interior cross section of a size to reduce the pressure by approximately 4.7 psi within passage 20 between the third fluid passing opening 56 and the discharge fluid passing opening 66. The flow is then discharged to the exterior of the hose through discharge fluid passing openings or outlet stations 66 in wall member 63 with a slight pressure loss of about 0.1 psi.

Because of the friction created as water passes through the small third fluid passage 20, the pressure adjacent to the discharge fluid-passing openings 66 is negligible (such as 0.1 psi or less), and the water actually drips out through the openings 66 under substantially quiescent conditions under almost no outward pressure.

The pressure drop loss between any inlet station and its nearest upstream station depends on the width and height of the intermediate flow restricting passage, the length of the same passage, and the rate of water passing through it.

In summary, and with reference to FIG. 6, beginning with 8 psi in the main supply channel 12, there are substantially six steps of pressure reduction as follows: 1. There is approximately 1.0 psi pressure loss within each segment, for example, segment 18C, of flow restricting channel 18; 2. There is a slight (approximately 0.2 psi) pressure loss across the second fluid passing openings, for example, opening 46B; 3. There is a pressure loss of approximately 1.5 psi within each segment, for example, segment 19B, of the second flow restricting channel 19; 4. There is another slight (approximately 0.5 psi) pressure loss across the third fluid passing openings, for example, opening 56A; 5. There is a substantial (approximately 4.7 psi) pressure loss within each segment, for example, segment 20A, of the third flow restricting channel 20; 6. Lastly, there is a very slight (approximately 0.1 psi) pressure loss across the discharge fluid passing openings, for example, opening 66B. Because the pressure loss across each discharge fluid passing opening is on the order of 0.1 psi, insect attacks to the discharge openings will have relatively little effect on the overall operation of the hose.

The flow characteristic for a hose of the preferred embodiment that has discharge outlets spaced at 8 inches and a total discharge rate of 0.5 gpm per 100 feet can be described as approximately 0.00333 gpm passing through each fluid passing opening 36, 46, 56, and 66 and approximately 0.001666 gpm passing through each flow restricting passage segment, such as those represented by 18A, 19A and 20A.

The preferred embodiment of the hose functions well in the frequently found uneven field conditions where there are sharp variations in the soil elevation such as a mound. There is substantially no flow from one segment of the flow restricting passage to another segment within the same flow restricting passage. Referring to FIG. 6, a portion of the water from inlet opening 36B flows into segment 18C where it continues to flow toward inlet opening 46B until it meets the flow of segment 18B which is coming from the opposite direction. The flows from segments 18B and 18C coming from opposite directions come together at inlet opening 46B where they both flow through opening 46B into the flow restricting passage 19. Since the flows of each segment in all the fluid restricting passages flow alternately in opposite directions, there is substantially no flow from one segment to another in any of the flow restricting passages 18-20 even if the hose 10 is on a sharp incline as much as 45°. Water supplied to a particular outlet opening 66 comes from inlet openings 36A, 36B, 36C and 36D all of which are within 12 inches of the outlet opening 66. Since there is substantially no longitudinal flow between segments in the flow restricting passages, and the outlet openings are essentially opposite their inlet openings, the flow rate out of a particular outlet opening 66 is affected by the pressure in the main supply channel at a point closest to the outlet opening 66. The hose of the preferred embodiment, with 8 psi in the main supply channel, placed in a field over a mound of soil 20 inches high still has a relatively uniform distribution pattern with only about a 10% decrease in flow on top of the mound as compared to the surrounding soil level.

The flow rate of the preferred embodiment is generally linear with the pressure in the main supply channel, so that the flow from an outlet opening at any given point along the hose is increased or decreased at substantially the same rate that corresponds to a pressure increase or decrease at that same point within the main supply channel.

An important aspect of the present invention is a self-cleaning feature within the third flow-restricting passage 20. Most of the total pressure reduction takes place within the segments of the third flow restricting passage 20. It has been observed that in the preferred embodiment more than 58% of the total pressure loss takes place within the segments (for example, segments 20A and 20B) of the third flow-restricting passage even though they have substantially the same length and cross-sectional dimensions as the first flow restricting passage 18 in which approximately 12% of the total pressure loss takes place and also have substantially the same dimensions as the second flow restricting passage 19 in which approximately 19% of the pressure loss takes place.

Figure 7:
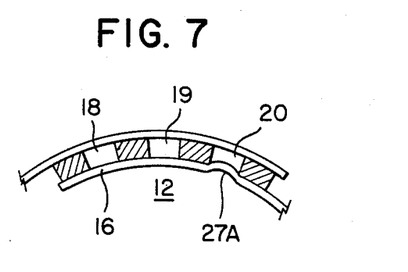
FIG. 7 is a view taken along lines 7—7 of FIG. 6.
Figure 8:
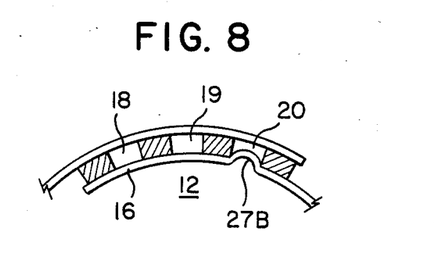
FIG. 8 is a view taken along lines 8—8 of FIG. 6.

FIG. 3 illustrates the cross-sectional view of the flow restricting passages 18, 19, and 20 in their normal configuration or as pressurized at a low pressure. FIG. 7 is a cross-sectional view of the flow restricting passages 18-20 at a point next to a fluid passing opening 56. FIG. 8 is a cross-sectional view of the flow restricting passages 18-20 at a point next to the discharge fluid passing openings 66. In FIG. 3, the common wall 16 is in its normal relaxed state, such as when there is no pressure or a low pressure (11 psi) in the main supply channel 12. The flow restricting passage 20 is open and relatively free flowing so that any minute impurities in the water will flush on through. However, when the working pressure of 8 psi is applied to the main channel there is approximately a 3.2 pressure differential across the common wall 16 at point 27A as shown in FIG. 7 causing the flow restrict passage 20 to be smaller due to outward deflection of the common wall 16 at point 27A. At the same time FIG. 8 shows a greater outward deflection of common wall 16 at point 27B due to the approximately 7.9 psi pressure differential across the common wall 16. The cross-section view of FIG. 7 is at the inlet fluid passing opening 56A (FIG. 6) of the flow restricting passage segment 20A and FIG. 8 is at the discharge fluid passing opening 66B of the flow restricting passage segment 20B. The amount of deflections of the common wall 16 into the flow restricting passage segment 20B gradually increases from the indentation at 27A in FIG. 7 to a substantial indentation at 27B in FIG. 8. When under working pressure, the cross-sectional area of the flow restricting passage segment 20B is substantially smaller than segments 18A and 19A. This smaller cross-sectional dimension provides the necessary pressure loss within segment 20B to give the desired flow. Yet segment 20B returns to its normal cross-sectional dimensions (FIG. 3) when the pressure is reduced at the end of the watering cycle. The segment 20B is self-flushing when it is in its normal configuration at a low pressure at both the beginning and end of the watering cycles. Any minute particles that may have accumulated during the watering cycle, due to the reduced size of segment 20B, are flushed at at this time.

As shown in FIG. 4, the main supply channel 12, formed by wall member 22, becomes circular when pressurized, forming a round tube essentially free of internal partitions or other obstructions that would provide additional surfaces in the flow channel causing more loss of pressure due to friction, as well as making the hose more difficult to collapse for storage and shipment.

As the hose is installed in the field, it is preferable to orient the hose so that the flow-restricting passages are on top. Foreign particles in the water normally settle to the bottom of the main supply channel and are less apt to enter the fluid passing openings and flow passages when they are on top of the hose.

Figure 9:
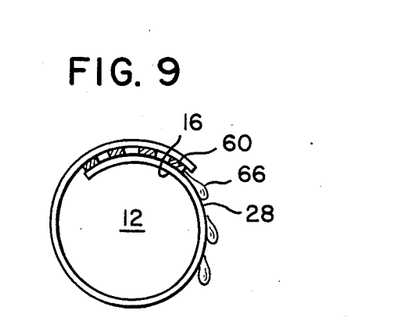
FIG. 9 is a cross-sectional view of the embodiment of FIG. 6.

Three elements are combined to cause the flow from the discharge fluid passing openings 66 to tend to fall directly below each opening 66 as shown in FIG. 9. First, the discharge fluid passing openings 66 are located in an upper quadrant of the hose rather than in the middle and on top of the hose. Second, the flow from the discharge openings 66 tends to come out approximately normal to the last set of strips 60 and pointed in a slightly downward angle when the hose is pressurized and in its normal upright position. Third, the common wall 16 forms one portion of the perimeter of each discharge fluid passing opening 66 so that the flow is in direct contact with the outer wall 28 as it passes through the discharge fluid passing openings and tends to cling to the surface of the outer wall 28 until it drops on the soil directly below each discharge fluid passing opening 66.

Referring to FIG. 6, each fluid discharge opening, for example, 66B, is supplied with the total flow from two segments 20B and 20C of the third flow restricting passage 20; by one-half the flow from each of four segmemts 19A, 19B, 19C, 19D of the second flow restricting passage 19 and by one-third of the flows from each of six segments 18A, 18B, 18C, 18D, 18E, 18F of the first flow restricting passage 18. Thus, it can be seen that if, for example, segments 18C, 19B, and 20B should become clogged due to a very poor water quality, the remaining segments would still supply the discharge fluid passing opening 66B, so that a flow would be maintained to the plants even though the flow would be less than the adjoining outlets.

Thus, it can be seen that the total accumulated length of segments 18C, 19C, and 20C of the flow restricting passages should be of substantially greater length than the distance between two adjacent discharge fluid passing openings 66 and, at the same time, the flow restricting channels should be continuous so that each discharge fluid passing opening is supplied by more than one flow restricting channel segment and more than one inlet fluid passing opening. By using a long total length of flow-restricting channels, it is possible at the same time to use a larger cross-section in the flow restricting channels and still maintain the same flow rate. The larger cross sections in the flow restricting channels provide a flow path that is less apt to clog from impurities in the water.

In a similar manner, the flow for each discharge fluid passing opening, for example, 66B, is supplied by 50% of the flow from each of the third inlet fluid passages 56A and 56B; by 25% of the flow through each of the second inlet fluid passing openings 46A and 46C and 50% of second inlet fluid passing opening 46B; and by 25% of the flow through each of four inlet fluid passing openings 36A, 36B, 36C and 36D (not shown). Again, it can be seen that if, for example, fluid passing openings 36A, 46A or 56A should become clogged, the remaining inlet fluid passing openings 36B, 36C, 36D, second fluid passing openings 46B, 46C and third fluid passing opening 56B would supply the discharge fluid passing opening 66.

While an 8 psi inlet water pressure is used to illustrate operation of a preferred embodiment, embodiments incorporating the teachings of the present invention will operate at inlet water pressures ranging from about 2 psi to 50 or more psi, depending on the strength of wall 22, fluid-passing opening sizes, ratios, etc.

With reference to FIGS. 18 through 24, a method and apparatus for manufacturing a hose embodying the teachings of the subject invention are disclosed.

Basically, the method and apparatus contemplate the disposition of a plurality of thermoplastic hot melt beads in a parallel relationship extending longitudinally along the exterior surface of one of the margins of an elongated film. The film is continually advanced and passes through a molding or forming station where each of the beads is deformed according to a predetermined pattern to create the various inlet and outlet stations found in the final hose. The film continues to advance and eventually passes through a guide which causes the interior surface along the other margin to be disposed about the beads. The film then advances through the nip of a pair of forming wheels and emerges as the finally assembled hose.

With continued reference to FIGS. 18 through 24, the details of the method and apparatus will now be described.

Initially, the impervious film is produced in a flat state. The film is introduced into the machine by placing it in its flat state under the nozzle 112 of a conventional extrusion nozzle where hot melt beads 113 are being extruded, and, at the same time, between the nip of the opposed rolls 122 and 124, which constitute the molding station 114. The film is also folded back upon itself and passed through a stationary guide member 126 located downstream of the molding station. The film, after passing through the guide station, is received within the nip of a pair of forming wheels 115 and 116, which constitute the forming station 131. The film emerges from the forming station as the complete hose. During production, the hose is continually advanced by the rotation of the forming wheels.

FIGS. 18 through 21 illustrate the details of the molding station 114 which basically comprises a pair of rotating wheels 122 and 124. Wheel 122 constitutes a bottom wheel and is mounted for rotation on an axis 141. Wheel 122 contains a flat cylindrical portion 143 bounded on either side by a pair of flange portions 145 and 147.

Wheel 124, which constitutes a top or molding wheel, is disposed above wheel 122 and rotates about an axis 151 which is essentially parallel to the rotation axis 141 of the bottom wheel. Wheel 124 has disposed about its periphery a number of teeth 153 positioned in a predetermined arrangement in order to produce a desired indentation pattern in the finished hose.

Figures 18, 19, 20:
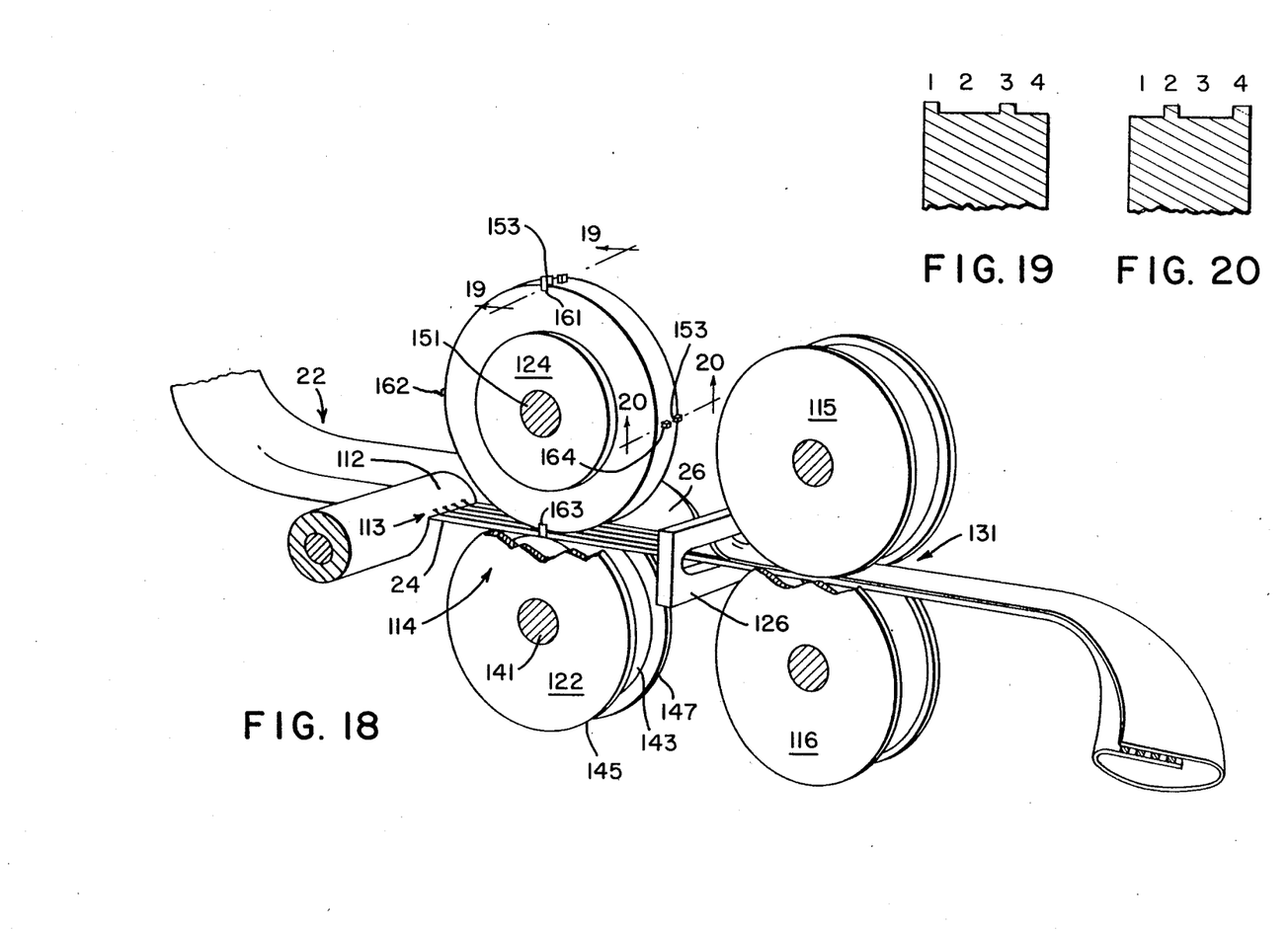
FIG. 18 is a perspective diagrammatic drawing to illustrate an embodiment of a machine used to manufacture a hose according to the teachings of the present invention.
FIG. 19 is a view taken along lines 19—19 of FIG. 18.
FIG. 20 is a view taken along lines 20—20 of FIG. 18.
Figure 21:
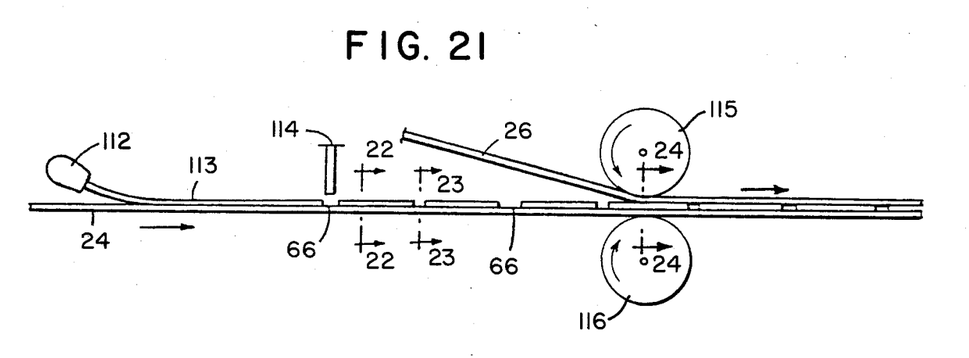
FIG. 21 is a schematic diagram illustrating the operation of the machine shown in FIG. 18.
Figure 22:
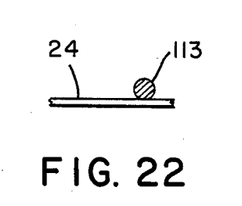
FIG. 22 is a view taken along lines 22—22 of FIG. 21 and is used to show the placement of a hot melt bead onto the thermoplastic film forming the outer portion of the hose.
Figure 23:
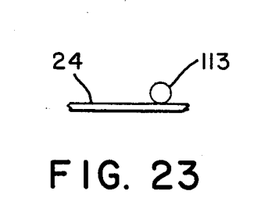
FIG. 23 is a view taken along lines 23—23 of FIG. 21 and is used to schematically illustrate the formation of an indentation in the hot melt bead.
Figure 24:
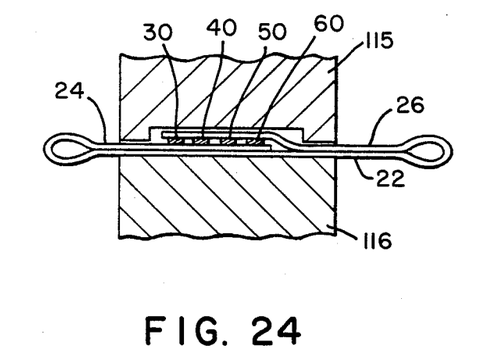
FIG. 24 is a view taken along lines 24—24 of FIG. 21 and is used to schematically illustrate the placement of two hot melt beads and their passage through the pair of forming rolls during the manufacture of the hose.

FIGS. 18 through 20 provide an example of the type of configuration that will produce a hose having an inlet and outlet pattern such as that shown for the hose in FIGS. 1 through 4. For this arrangement, the wheel 124 has a 16 inch circumference. Four molding assemblies 161 through 164, each of which contains a predetermined arrangement of teeth 153, are disposed about the circumference at 90° intervals. FIG. 19 shows a sectional view of the arrangement of teeth for assemblies 161 and 163, whereas FIG. 20 shows such an arrangement for assemblies 162 and 164. As can be seen, beads 30 and 50 are indented at the same time. Beads 40 and 60 are also indented at the same time. In this way, the desired pattern shown in FIG. 4 is produced. Typically, the teeth have a thickness in the range from about 0.030 inches to about 0.090 inches depending on the desired space between the strips.

The circumferences of the wheels 122 and 124 are arranged relative to each other to provide a nip or space therebetween for receiving the thermoplastic film and the plurality of hot melt beads.

The film and beads pass between the nip rolls 122 and 124 which rotate at the same speed that the film and beads are traveling. As a hot melt bead passes under the teeth in the top nip roll 124, each bead is molded into separate longitudinal strips. The top nip roll is spaced from the bottom nip roll at a distance so that, when the film and beads pass between the nip rolls, beads are slightly flattened within the space between the top and bottom nip rolls.

It is understood that while the preferred method is to start with film and lay hot melt beads on the film after which the beads are molded into strips, an alternate method and apparatus is to extrude a one piece flat sheet with parallel longitudinal ridges formed along one margin as it leaves the extrusion die. As an equivalent of the film and beads in the preferred embodiment, the flat strip with longitudinal ridges, while still hot, then passes through a station to mold the strips as in the preferred embodiment.

While the preferred embodiment describes a rotary molding station, the scope of this invention also includes any method and apparatus for advancing the film and bead and bringing a mold into contact with the hot melt bead and molding longitudinally spaced apart parallel strips which are used for the purpose of both sealing the hose, forming fluid restricting passages, and permitting flow both between the parallel fluid passages and also to the exterior of the hose. One such method and apparatus would be moving the film and bead under a mold, stopping the film and bead momentarily while an overhead molding die comes down upon the beads to create the strips, then raising the mold die and again advancing the film and beads thereby, by repeated operation, making a continual row of parallel and longitudinal hot strips which are then formed into the hose as in the preferred embodiment.

Figure 10:
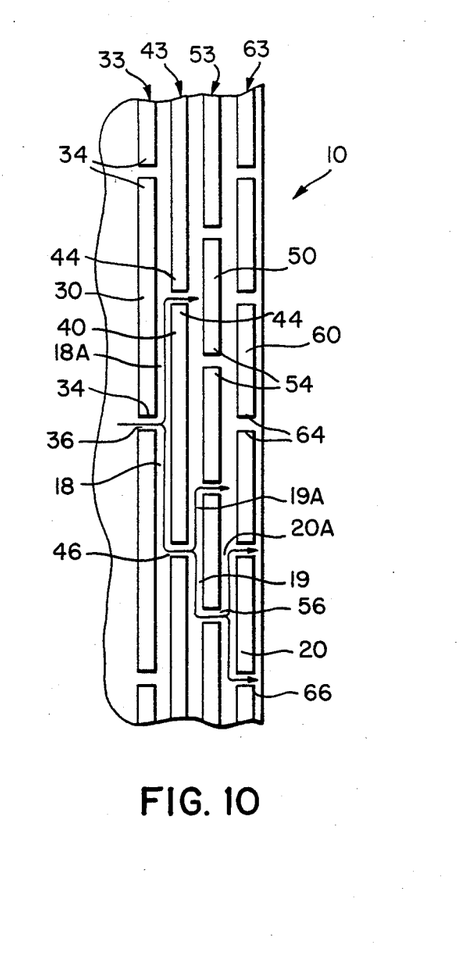
FIG. 10 is yet another embodiment of a hose incorporating the teachings of the subject invention.

FIG. 10 shows yet another embodiment for a hose embodying the teachings of the subject invention. In this arrangement, the distances between adjacent inlet stations defined in both strips 50 and 60 have been reduced so that the distance between adjacent inlet stations 56 is four inches and the distance between adjacent outlet stations 66 is likewise four inches. The distances between adjacent inlet stations 36 and 46 remain unchanged at eight inches.

Figure 11:
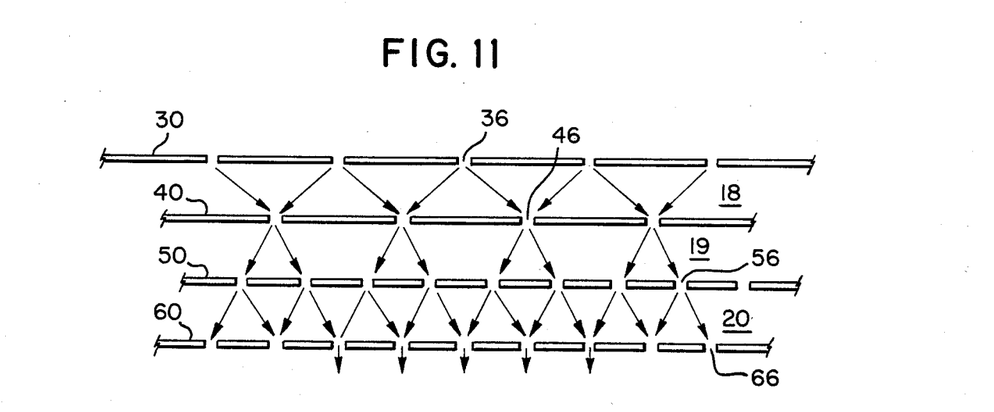
FIG. 11 is a schematic diagram used to help explain the operation of the embodiment of FIG. 10.

The flow path of this type of configuration may be explained with reference to FIGS. 10 and 11, where it can be seen that there are twice as many openings 56 and 66 as there are openings 46 and 36. If we assume the flow rate for a given hose with outlets spaced 4 inches apart is 0.6 gpm per 100 foot length, the theoretical flow through each opening 56 and 66 is 0.002 gpm and the flow through each opening 36 and 46 is 0.004 gpm. The flow through segment 20A is 0.001 gpm while the flow through segments 18A and 19A are 0.002 gpm. The length of segments 20A and 19A are 2 inches, while the length of segment 18A is 4 inches. If the configurations were used as shown in FIG. 6 but with a 4 inch outlet spacing, all of segments 18C, 19B and 20A would be 2 inches, with the total combined length of the flow passage segments through which the water has to travel between the inlet openings 36 and the discharge openings 66 being 6 inches. However, with the embodiment illustrated in FIGS. 10 and 11, the total length of the flow passage segments 18A, 19A and 20A through which the water has to travel between the inlet openings 36 and the outlet openings 66 is 8 inches. This longer total combined length flow passage produces a greater pressure loss due to friction. In addition, the flow rates in flow restricting segments 18A and 19A of FIG. 10 are twice the flow rate that they would have been in the configuration shown in FIG. 6. These higher flow rates in flow restricting segments 18A and 19A of FIG. 10 produce a still greater pressure loss. This additional pressure loss reduces the flow rate through the discharge openings 66 so that it is possible to have closer outlet spacing, such as 4 inches, without greatly increasing the total flow rate from the hose.

Another example of reducing flow rate for a given outlet spacing would be using a 24 inch spacing for inlet openings 36 and 46 and a 12 inch spacing for inlet openings 56 and outlet openings 66.

Figure 12:
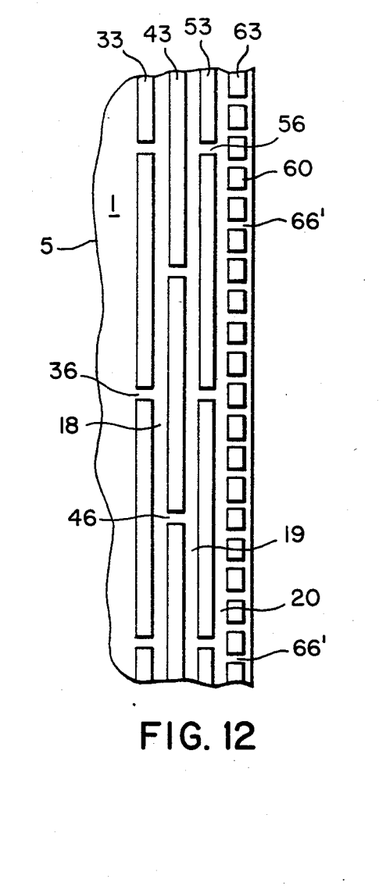
FIG. 12 is a schematic diagram of still another embodiment of a hose incorporating the teachings of the subject invention.

FIG. 12 shows yet another embodiment where like reference numerals denote like elements, and only the differences will be described. The arrangement of FIG. 12 is similar to that of the first preferred embodiment with the exception that the strip 60 is arranged to include a plurality of closely spaced outlet stations 66' such as ¼ inch to 1 inch apart. This type of arrangement can be advantageously used to irrigate plants growing in a media of extremely porous nature.

Figure 13:
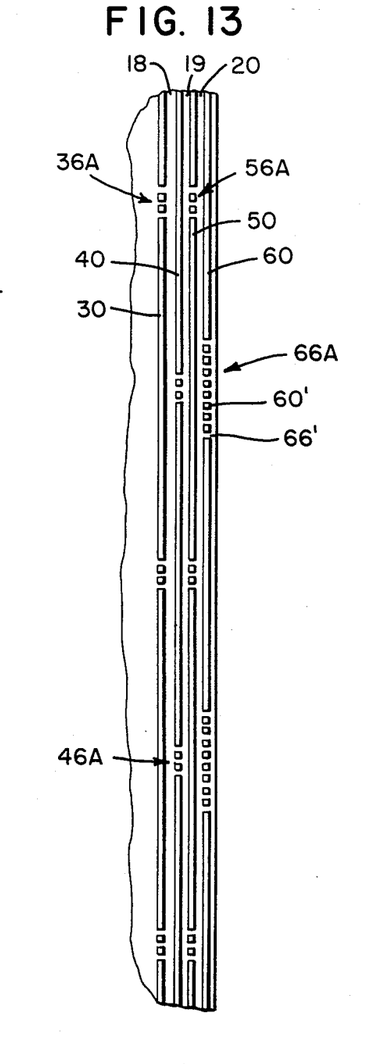
FIG. 13 illustrates yet another embodiment of a hose adopting the teachings of the subject invention.

As can be appreciated from the foregoing discussion, there are any number of arrangements of inlet and outlet station patterns as well as dimensional arrangements for flow-restricting passages, according to the requirements for the area to be irrigated. For example, FIG. 13 shows an arrangement where the inlet stations are each defined by three closely spaced openings 36A and each outlet station is defined by numerous closely spaced openings 66A. Further, each of the outlet stations is spaced apart at predetermined distances.

It is often desirable to irrigate flower pots at several intervals across the top of the pot so that the entire root area is watered uniformly. The embodiment of FIG. 13 provides an ideal way to irrigate a row of 6 inch flower pots spaced on 12 inch centers. The hose is stretched lengthwise over the top of pots so that there are several outlets to drip on each pot. A hose for such an application has inlet stations 36A, 46A, and 56A spaced at 12 inch intervals and outlet stations 66 spaced at 12 inch centers each consisting of 10 or 12 outlet openings spaced about ¼ inch apart. This provides a row of drops about 2½ to 3 inches in length in the center of each pot.

A similar application for this embodiment is a row of trees spaced 20 feet apart. A hose is run lengthwise of the row and next to the trees and centered on each tree are 12 outlet openings 66 spaced 12 inches apart with no openings between so that the irrigation is concentrated only on the area of the tree roots.

Of course, it is to be understood that the various inlet and outlet station configurations may be produced by the method described hereinbefore by simply arranging the appropriate arrangement of teeth. Thus, it can be seen that, by simply changing the molding wheel, a new pattern may be introduced into the hose without any further change of the production equipment.

Figure 14:
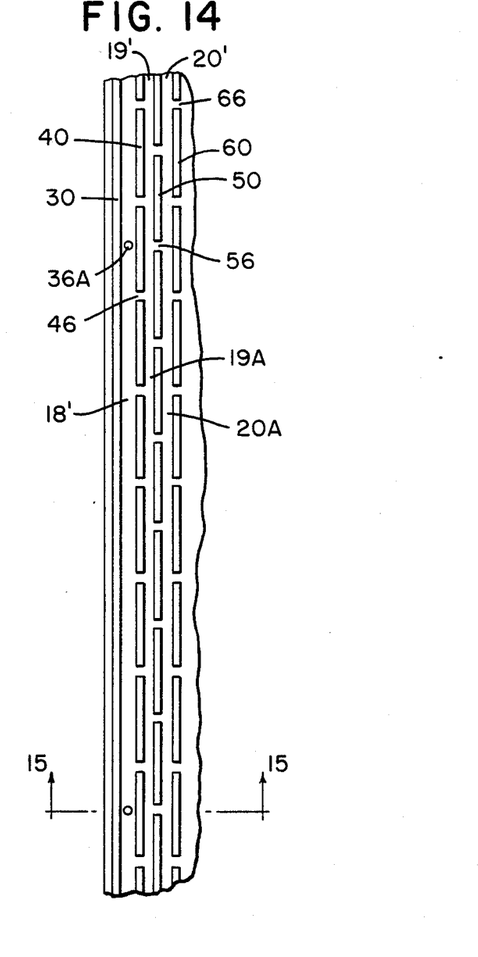
FIG. 14 shows a modification made to the embodiment of FIG. 1.
Figure 15:
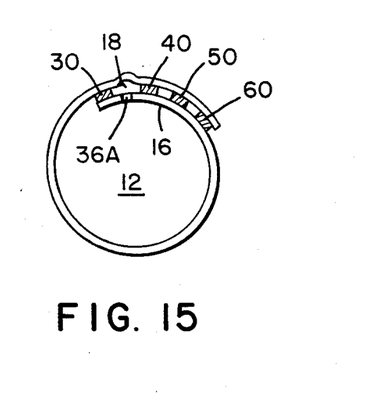
FIG. 15 is a view taken along lines 15—15 of FIG. 14.

FIGS. 14 and 15 show yet another embodiment for a hose produced according to the teachings of the subject invention. This embodiment combines the hydraulic principle of pressure loss due to water flowing through an orifice and pressure loss due to water flowing through a flow restricting channel, wherein the flow rate through the orifice changes at approximately a ratio of the square root of the change in pressure while the flow rate through the flow restricting channel changes approximately linearly with the pressure change. This combination gives a flow rate from the outlets 66 that changes in response to pressure change at a rate somewhere between linear and the square root of pressure change depending on the structural dimensions of the inlet openings and the length and cross-sectional area of the flow restricting channels. This embodiment is similar to that shown in FIG. 4 with the exception that bead 30 is of unitary construction with no indentations being provided. Instead, inlet orifices 36A are provided within the film to create the fluid communication path between the main supply channel 12 and the flow distributing channel 18'. In addition, the flow distributing channel 18' flow from each inlet orifice 36A to move through the flow distributing channel 18' to the fluid passing orifices 36A in the immediate vicinity without substantial pressure loss. At the same time, the flow distributing channel 18' has a cross-sectional area small enough so that a major portion of the flow from each inlet orifice 36A will tend to flow out of the fluid passing openings 46 in the immediate vicinity of the inlet orifice 36A. This vicinity will normally consist of a length half way to adjacent inlet orifices 36A. In a typical embodiment, the inlet openings 36A are approximately 0.024 inches in diameter and spaced about 48 inches apart. The two flow restricting passages 19' and 20' are approximately 0.014 inches high and 0.070 inches wide and the first, second and third fluid passing openings 46, 56 and 66 are on 8 inch centers. With an 8 psi pressure in the main supply channel 12, a typical pressure loss across the inlet openings would be approximately 3 psi and a pressure loss within the first flow restricting passage 19' would be approximately 3.5 psi with approximately a 1.5 psi pressure loss within the flow restricting passage 20'.

Since the flow rate from the outlets change substantially less than the pressure changes within the main supply channel, it is possible to use longer rows with the same uniformity than would be possible to use a hose where the outlet flow was linear with pressure.

The hydraulic flow characteristic for the embodiment of FIGS. 14 and 15 could be described as a hose with 8 psi in the main supply channel with inlet orifices 36A spaced 48 inches apart and of such a size that each will pass 0.02 gpm at a pressure loss of 3 psi, whereupon this 0.02 gpm flow is divided for passage through 6 first fluid passing openings 46, spaced on 8 inch centers, and then is further divided for passage into 12 flow restricting passage segments 19A, each approximately 4 inches in length and of a cross-sectional size so that each segment will carry 0.0016666 gpm at a pressure loss of 1.5 psi.

Whereupon there is approximately 0.5 psi pressure loss as the flow passes through the fluid passing openings 56 into 12 second fluid restricting passage segments 20A each approximately 4 inches in length and of a cross-sectional size so that each segment will carry 0.001666 gpm at a pressure loss of approximately 2.9 psi so that the pressure within the flow restricting passages 20 adjacent to the outlet openings 66 is approximately 0.1 psi whereupon the flow passes through the 8 spaced outlet openings 66 in the form of a slow drip. The total flow from the 150 outlets (or 100 feet of hose) would be 0.5 gpm with a total pressure reduction of 7.9 psi between main supply channel 12 and a point which is adjacent to the outlet openings and in the flow restricting passage 20.

This embodiment is configured so the flow rate out of the outlet openings 66 can be designed to suit the crop by changing the spacing and diameter of the inlet orifices 36A and/or the cross-sectional dimensions and length of the flow restricting passages 19' and 20'. Also, the hose can be made to function so that a major percent of the pressure drop takes place either across the inlet orifice or within the flow restricting passages.

Figure 16:
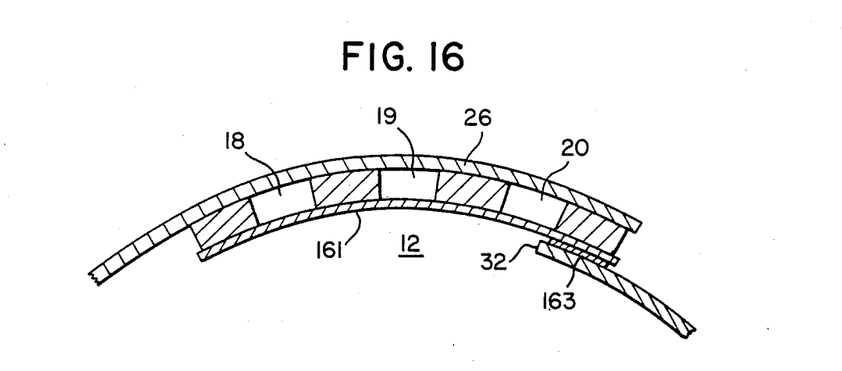
FIGS. 16 and 17 show yet another modification to the embodiment of FIG. 2.
Figure 17:
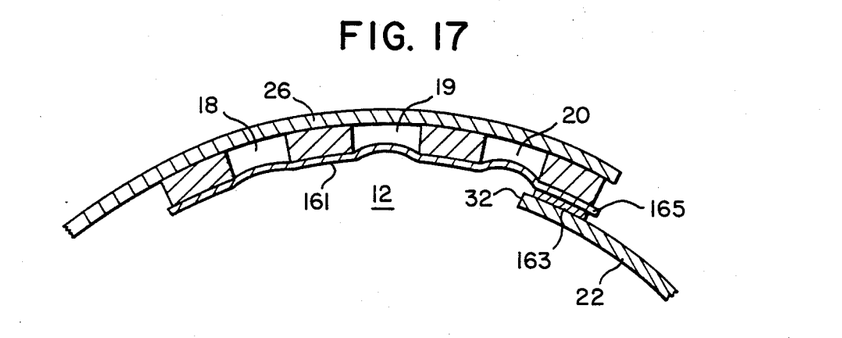

FIGS. 16 and 17 illustrate yet another embodiment of the hose 10. As shown in FIGS. 16 and 17, the flow restricting channels 18, 19 and 20 are defined in part by an elongated flat film 161 which is of reduced thickness. This film replaces the margin area 24 in the embodiment of FIG. 4. For this reason, the edge 32 of sheet 22 is secured to the margin 165 of the sheet 161 by a conventional hot melt bead 163. The reduced thickness of the common wall 161 allows each of the flow restricting passageways 18, 19 and 20 to be reduced in size and thereby create a greater friction when the main channel 12 experiences an increase in water pressure. The reduction in cross-sectional area under the increase in water pressure is illustrated in FIG. 17.

This embodiment gives a uniform flow from a longer length of row. At the inlet end of the hose, the higher pressure (12 psi, for example) within the main channel 12 causes the thinner portion of common wall 161 to stretch and deflect outwardly as in FIG. 17 and into the flow restricting passages 18, 19 and 20, while at the same time the exterior common wall 26 portion of the flow restricting passages holds its normal dimensions because it is a heavier wall that does not stretch substantially. An alternative to using a thinner wall for the sheet 161 is to use a material of the same thickness but with a greater ability to stretch under pressure than the material used for common exterior wall 26.

This reduces the size of the flow restricting passageways and consequently reduces the flow through said passageways. As the flow travels through the main channel 12 in very long lengths of hose, the pressure within is gradually reduced due to friction so that the closed off end of the main channel 12 has substantially less pressure (6 psi, for example) than the inlet end. The thin common wall 161 at the closed off end of the hose has less pressure against it and maintains its normal circular configuration (FIG. 16) allowing the flow restricting passageways to hold their normal cross-sectional area and flow. Therefore, the flow at the inlet end and the closed off end can be substantially the same even though there is about a 50% loss in pressure due to friction within the main channel 12. It is understood that the thin section 161 may be a thinner portion of sheet 22 rather than a separate sheet. The net effect is that the size of the flow restricting passages are pressure compensating to give a relatively uniform flow throughout the length of the hose. Hoses which have the pressure-compensating, flow restricting passages are suited to fields in which the rows run up or downhill, since the flows from the outlets remain relatively even though the pressures within the main flow channel alter with changes in elevation.

While descriptions herein have generally referred to water and fluid passages, it is understood the same hose can be used for chemical solutions such as insecticides, fungicides, fertilizers and also compressed air for soil aeration.

Since there is a wide variety of conditions encountered in the field, it is understood that the preferred embodiments are just a few of the many combinations of ratios and sizes of first fluid-passing openings, spacing of second fluid-passing openings, spacing of discharge fluid-passing openings, cross section of the fourth fluid passages, and pressures introduced into the main supply channel, which fall within the scope and function of this invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed is:

1. Apparatus for manufacturing an elongated fluid-distributing hose made from an elongated plastic film and at least one plastic bead, said apparatus comprising:
    means for moving the film in a desired direction that is essentially parallel to the longitudinal axis of the film;
    means for orienting the film to expose one of the two surfaces of the film along one of the longitudinal margins of the film;
    extrusion nozzle means for extruding the at least one plastic bead, said nozzle means oriented relative to said one surface of the film so that said bead is disposed on said one surface essentially parallel to the longitudinal axis of the film;
    molding means for periodically creating a permanent depression in said at least one bead;
    folding means for folding the film about its longitudinal axis so that the other of the two surfaces of the film along the other of the longitudinal margins of the film comes into contact with said at least one bead; and
    means for securing the other margin to said at least one bead.

2. The apparatus of claim 1, wherein said at least one plastic bead is a plurality of plastic beads and said nozzle means disposes said plastic beads in an array of adjacently arranged, essentially parallel plastic beads.

3. The apparatus of claim 1, wherein said means for moving comprises a pair of opposed forming wheels defining a nip through which said film is drawn during the rotation of said forming wheels.

4. The apparatus of claim 1, wherein said molding means comprises at least one molding tooth movable toward and away from said at least one bead to create said permanent depression.

5. The apparatus of claim 4, further comprising a molding wheel, means for mounting said tooth at a predetermined location on the periphery of said wheel, and means for rotating said wheel.

6. A method of making an elongated fluid-distributing hose from an elongated plastic film and at least one plastic bead, said method comprising the steps of:
- moving the film in a desired direction that is essentially parallel to the longitudinal axis of the film;
- orienting the film to expose one of the two surfaces of the film along one of the longitudinal margins of the film;
- extruding said at least one plastic bead;
- disposing said at least one bead on said one surface, said at least one bead being essentially parallel to the longitudinal axis of the film;
- periodically creating a permanent depression in said at least one bead;
- folding the film about its longitudinal axis so that the other of the two surfaces of the film along the other of the longitudinal margins of the film comes into contact with said at least one bead; and
- securing the other margin to said at least one bead.

7. The method of claim 6, wherein said at least one plastic bead is a plurality of plastic beads and said disposing step includes disposing said plastic bead in an array of adjacently arranged, essentially parallel plastic beads.

8. The method of claim 6, wherein said moving step comprises drawing said film through the nip of a pair of opposed rotating forming wheels 9. The method of claim 6, further comprising the step of providing said film as a flat sheet.

10. The method of claim 6, wherein said molding step comprises moving at least one molding tooth toward and away from said at least one bead to create said permanent depression.

11. The method of claim 10, further comprising the step of mounting said tooth at a predetermined location on the periphery of a molding wheel, and rotating said wheel to cause said tooth to create said permanent depression.

12. Apparatus for manufacturing an elongated fluid-distributing hose made from an elongated plastic film, said apparatus comprising:
- means for moving the film in a desired direction that is essentially parallel to the longitudinal axis of the film, said film having at least one plastic bead disposed on one of the two of the film surfaces along one of the longitudinal margins of the film essentially parallel to the longitudinal axis of the film;
- molding means for periodically creating a permanent depression in said at least one bead;
- folding means for folding the film about its longitudinal axis so that the other of the two surfaces of the film along the other of the longitudinal margins of the film comes into contact with said at least one bead; and
- means for securing the other margin to said at least one bead.

13. The apparatus of claim 12, wherein said at least one plastic bead is a plurality of plastic beads and said plastic beads are adjacently arranged in an array of essentially parallel plastic beads.

14. The apparatus of claim 12, wherein said means for moving comprises a pair of opposed forming wheels defining a nip through which said film is drawn during the rotation of said forming wheels.

15. The apparatus of claim 12, wherein said molding means comprises at least one molding tooth movable toward and away from said at least one bead to create said permanent depression.

16. A method of making an elongated fluid-distributing hose from an elongated plastic film, said method comprising the steps of:
- moving the film in a desired direction that is essentially parallel to the longitudinal axis of the film, said film having at least one plastic bead disposed on one of the two surfaces of the film along one of the longitudinal margins of the film essentially parallel to the longitudinal axis of the film;
- periodically creating a permanent depression in said at least one bead;
- folding the film about its longitudinal axis so that the other of the two surfaces of the film along the other of the longitudinal margins of the film comes into contact with said at least one bead; and
- securing the other margin to said at least one bead.

17. The method of claim 16, wherein said at least one plastic bead is a plurality of plastic beads and said plastic beads are disposed in an array of adjacently arranged, essentially parallel plastic beads.

18. The method of claim 16, wherein said moving step comprises drawing said film through the nip of a pair of opposed rotating forming wheels.

19. The method of claim 16, wherein said molding step comprises moving at least one molding tooth toward and away from said at least one bead to create said permanent depression.

20. The method of claim 19, further comprising the step of mounting said tooth at a predetermined location on the periphery of a molding wheel, and rotating said wheel to cause said tooth to create said permanent depression.

* * * * *